United States Patent [19]

Shinto et al.

[11] Patent Number: 4,829,848

[45] Date of Patent: May 16, 1989

[54] ENERGY ABSORBING APPARATUS FOR STEERING WHEEL

[75] Inventors: Hiroaki Shinto; Syuji Nakamura; Terumoto Yamaguchi; Tomiji Oguri, all of Aichi, Japan

[73] Assignee: Kabushiki Kaisha Tokai-Rika-Denki-Seisakusho, Aichi, Japan

[21] Appl. No.: 820,148

[22] Filed: Jan. 21, 1986

[30] Foreign Application Priority Data

Jan. 22, 1985 [JP] Japan ............................ 60-6880[U]

[51] Int. Cl.⁴ .......................... B62D 1/04; G05G 1/10
[52] U.S. Cl. .......................................... 74/552; 280/750
[58] Field of Search ..................... 74/552; 29/159 B; 280/777, 750

[56] References Cited

U.S. PATENT DOCUMENTS

| | | | |
|---|---|---|---|
| 2,765,674 | 10/1956 | Robards | 74/552 |
| 3,948,118 | 4/1976 | Garbin | 74/552 |
| 4,390,193 | 6/1983 | Strahan et al. | 74/552 |

FOREIGN PATENT DOCUMENTS

| | | | |
|---|---|---|---|
| 12688 | 5/1979 | Japan | 74/552 |
| 42231 | 9/1983 | Japan | 74/552 |
| 1360025 | 7/1974 | United Kingdom | 74/552 |

*Primary Examiner*—Gary L. Smith
*Assistant Examiner*—Vinh Luong

[57] ABSTRACT

An energy absorbing apparatus for a steering wheel includes an energy absorbing portion or member disposed between a steering shaft and a steering wheel rim. The energy absorbing member is constituted by an annular relatively thin plate which surrounds the axis of the steering shaft. A portion of the energy absorbing member is bent in the plane orthogonal to the axis of the steering shaft, whereby the bent portion is deformed when a collision occurs, and the kinetic energy is thereby absorbed. The deformable bent portion is provided with a plurality of slits extending radially of the steering shaft and has embossed portions each defined between a pair of adjacent slits, whereby it is possible to control the absorption of any impact load and adjust the amount of kinetic energy which it is intended should be absorbed.

15 Claims, 2 Drawing Sheets

ENERGY ABSORBING APPARATUS FOR STEERING WHEEL

BACKGROUND OF THE INVENTION

1. Field of the Invention

The present invention relates to an energy absorbing apparatus for a steering wheel employed in a vehicle. More particularly, the present invention pertains to an energy absorbing apparatus capable of absorbing the impact load and kinetic energy transmitted to the steering wheel in an emergency situation of the vehicle.

2. Description of the Related Art

For the purpose of reducing the impact load which acts on the steering wheel of a vehicle in an emergency situation, apparatuses in which an energy absorbing member is mounted on the steering wheel have already been proposed (e.g., Japanese Patent Publication No. 12688/1979 and Japanese Utility Model Publication No. 42231/1983).

These proposed conventional energy absorbing apparatuses, however, suffer from various disadvantages. For example, one type of conventional energy absorbing apparatus has a structure in which a multiplicity of parts are required, and another type involves a troublesome and complicated machining or working operation because of the provision of a bent portion at an intermediate position in a cylindrical member which is disposed between a steering shaft and a steering wheel rim.

In a case where a plate material is employed as an energy absorbing member in such an energy absorbing apparatus, it is particularly necessary to provide this member with a predetermined rigidity for reliably withstanding both the steering force applied thereto during steering operation and the load which the driver applies in the axial direction of the steering shaft. For this reason, the plate material employed needs to have a relatively large thickness, though on the other hand a thick-walled plate material leads to difficulty in reducing the weight of the energy absorbing member and necessitates a continuance or means for controlling the absorption of the impact load which is applied at the time of collision of the vehicle.

SUMMARY OF THE INVENTION

In view of the above circumstances, it is a primary object of the present invention to provide an energy absorbing apparatus for a steering wheel which requires a reduced number of parts and can reliably bear the loads applied to the steering shaft during normal running of the vehicle with a simplified structure, as well as facilitating the control of the absorption of the impact load which is applied at the time of collision of the vehicle.

To this end, the present invention provides an energy absorbing apparatus for a steering wheel in which a continuous and annular energy absorbing assembly is interposed between a steering wheel rim and a steering shaft in such a manner as to surround the axis of the steering shaft, the energy absorbing portion having an intermediate a first annular portion fixed to the boss of the wheel, a second annular portion fixed to spokes connected to the steering wheel rim, and portion thereof which is bent in the plane orthogonal to the axis of the steering shaft, the bent portion being provided with a plurality of embossed portions each defined by a pair of adjacent sheared portions, or slits, so that the bent portion serves as a deformable portion.

Since the energy absorbing portion in accordance with the present invention is a continuous and annular member which surrounds the axis of the steering shaft, it is possible to reliably bear loads such as the steering force which the driver applies during normal running of the vehicle even if the energy absorbing portion has a relatively small thickness. In addition, the slits formed in the deformable bent portion of the energy absorbing portion allow control of the absorption of any impact load applied to the steering wheel at the time of a collision and also permit selection of the amount of kinetic energy which it is intended should be absorbed. In other words, it is possible to adjust the impact load which it is to be intended should be absorbed by changing the size and number of slits and bent portions.

BRIEF DESCRIPTION OF THE DRAWINGS

The above and other objects, features and advantages of the present invention will become more apparatus from the following description of the preferred embodiment thereof, taken in conjunction with the accompanying drawings, in which like reference numerals denote like elements, and in which.

DESCRIPTION OF THE PREFERRED EMBODIMENT

Figure 1:
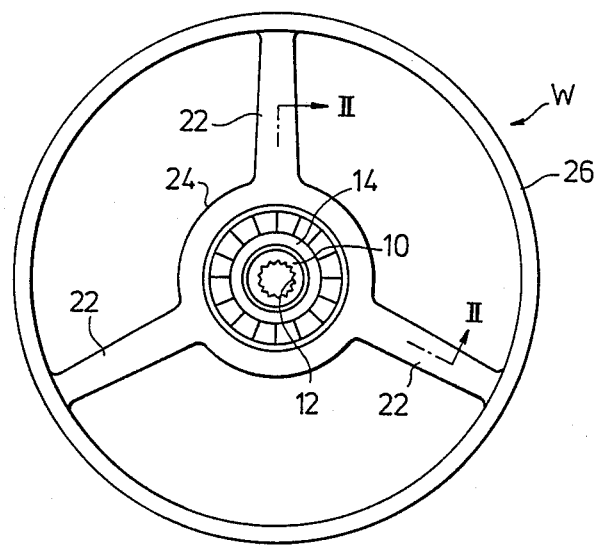
FIG. 1 is a front elevational view of a steering wheel to which one embodiment of the energy absorbing apparatus according to the present invention is applied, as viewed in the axial direction of the steering shaft thereof.

FIG. 1 shows a steering wheel W to which one embodiment of the energy absorbing apparatus according to the present invention is applied. In this embodiment, a boss 10 having a through-hole 12 is disposed coaxially with respect to the axis A of the steering wheel W, and a steering shaft (not shown) is rigidly fitted into the through-hole 12. For this purpose, a serration is cut in the inner periphery of the through-hole 12.

An energy absorbing portion or member 14 is secured to the outer peripheral portion of the boss 10. The member 14 is formed from a thin-walled plate material such as to have a continuous and annular structure which surrounds the axis of the steering shaft secured into the boss 10.

Figure 2:
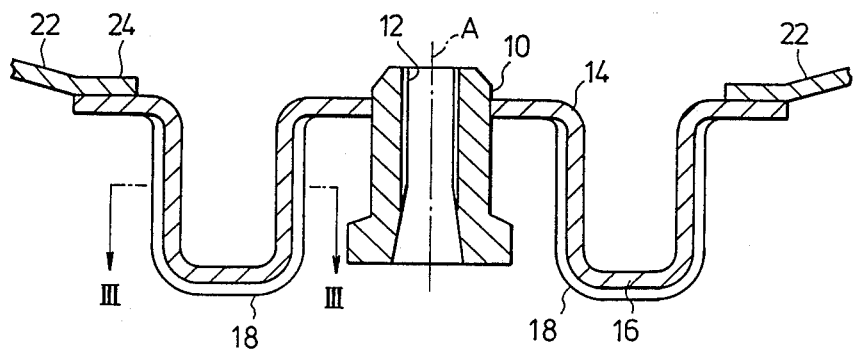
FIG. 2 is a sectional view taken along the line II—II of FIG. 1.
Figure 3:
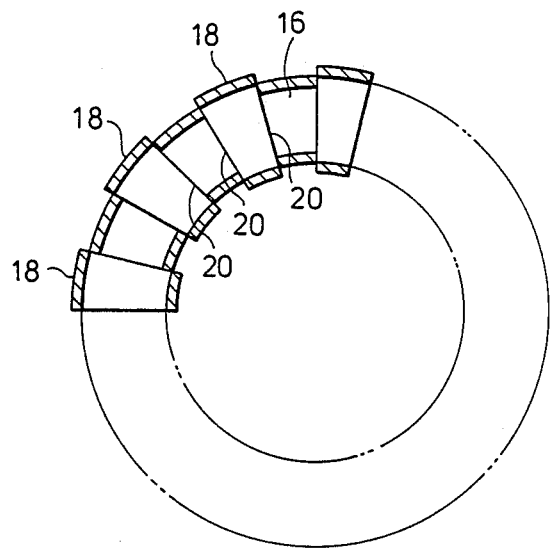
FIG. 3 is a sectional view taken along the line III—III of FIG. 2.

As shown in FIG. 2, a bent portion 16 is formed at an intermediate position in the energy absorbing member 14 such as to have a U-shaped cross-section as viewed in a direction orthogonal to the axis A of the steering shaft, the bent portion 16 serving as a deformable portion. As also shown in FIG. 3, a plurality of embossed or enlarged-diameter portions 18 are formed on the bent portion 16 at predetermined regular spacings. Slits 20 are respectively formed at both sides of each enlarged-diameter portion 18, the slits 20 extending radially from the axis A of the steering shaft. The enlarged-diameter portions 18 can be easily formed by punching the bent portion 16 from the inside (the upper side as viewed in FIG. 2) of the bent portion 16 using a punch having an outer diameter larger than the inner diameter of the bent portion 16. It is a matter of course to employ, in forming the enlarged-diameter portion 18, a female die which conforms with the respective external shapes of the bent portion 16 and the enlarged-diameter portions 18.

As is evident in both FIGS. 2 and 3, the structure which results from the use of such a female die is a continuous bent portion 16 having a plurality of embossed or enlarged-diameter portions 18 whose edges are offset from but mutually contiguous with the non-embossed portions of the bent portion 16.

A hub 24 for spokes 22 is secured to the outer peripheral portion of the energy absorbing member 14 by welding or other similar means. Three spokes 22 extend radially from the hub 24. The respective distal ends of the spokes 22 are secured to a steering wheel rim 26 by, for example, welding, the rim 26 being disposed coaxially with the boss 10.

The steering wheel W in according with this embodiment thus arranged is mounted on a steering column in such a manner that the boss 10 is secured to the distal end portion of the steering shaft (not shown) by means of fitting.

When the driver turns the rim 26, the steering force is transmitted to the steering shaft. This steering force, together with the force which the driver applies in the axial direction of the steering shaft, is transmitted to the steering shaft through the spokes 22 and the energy absorbing member 14. The bent portion 16 is capable of reliably bearing these forces or loads, since the bent portion 16 has a continuous and annular structure which surrounds the axis of the steering shaft. It is therefore possible to employ a plate material having a relatively small thickness for the energy absorbing member 14. In addition, it is possible to reduce the diameter of the member 14. Accordingly, the production yield in terms of material is increased as compared with the case wherein an energy absorbing member which projects radially is formed by punching a plate material.

When the driver hits the steering wheel W in an emergency situation of the vehicle, the bent portion 16 is deformed, and the force of the impact is thereby absorbed. The provision of a plurality of embossed or enlarged-diameter portions 18 on the bent portion 16, each defined by a pair of adjacent slits 20, is particularly useful since it facilitates selection of a desired number of such portions in accordance with the amount of kinetic energy which a given steering wheel is required to absorb at the time of a collision. The slits 20 particularly serve to reduce the impact load which needs to be absorbed at an early stage of energy absorption when a collision occurs and hence to suppress the counterforce which acts on the driver's body, thus contributing to lowered levels of damage.

Although in the above embodiment the curve of the bent portion 16 faces downwardly in the axial direction of the steering shaft, that is, away from the driver, the structure of the bent portion 16 is not necessarily limited to that of the embodiment, and the bent portion 16 may have other configurations. For example, the bent portion 16 may be provided such that the curve thereof faces in the direction opposite to the above.

As has been described above, the energy absorbing apparatus according to the present invention includes a continuous and annular energy absorbing portion or member which surrounds the axis of the steering shaft, and a plurality of slits are formed in the deformable bent portion of the energy absorbing member. It is therefore possible to reduce the number of parts required for the apparatus, simplify the structure, and reliably bear the loads applied to the steering wheel during normal running of the vehicle. In addition, it is possible to reduce the impact load which is applied to the steering wheel at an early stage of energy absorption when a collision of the vehicle occurs and to control or select as desired the amount of kinetic energy which it is intended should be absorbed.

What is claimed is:

1. An energy absorbing apparatus employed in a steering wheel of a vehicle for absorbing the kinetic energy generated when a driver's body hits the steering wheel, said apparatus comprising:
    (a) a boss having a through-hole for receiving a steering shaft, wherein said through-hole has a center;
    (b) a steering wheel rim by means of which the driver steers the vehicle;
    (c) spokes for connecting said boss and said steering wheel rim;
    (d) an annular energy absorbing assembly interposed between said boss and said spokes in such a manner as to surround said boss, said energy absorbing portion having a first annular portion fixed to said boss, a second annular portion fixed to said spokes and a continuous intermediate portion between said first and second annular portion, said intermediate portion being bent in a plane that includes the center axis of the through-hole of said boss to form a bent portion, the bent portion being provided with a plurality of embossed portions defined by a selected number of radially oriented slits in the bent portion wherein the edges of each embossed portion are contiguous with the adjacent edges of the bent portion, whereby the annular assembly enables steering force to be reliably transmitted to said steering shaft, while the selected number of slits allows control of the absorption of any impact load and also permits selection of the amount of kinetic energy to be absorbed.

2. An energy absorbing apparatus according to claim 1, wherein said bent portion has a substantially U-shaped cross-section as viewed in a direction orthogonal with respect to the through-hole that receive said shaft.

3. An energy absorbing apparatus according to claim 1, wherein said sheared portions extend substantially radially around said boss.

4. An energy absorbing apparatus according to claim 2, wherein each of said embossed portions is bounded by a pair of adjacent sheared portions and has an enlarged outer diameter.

5. An energy absorbing apparatus according to claim 1, wherein a hub for steering wheel spokes is secured to said second annular portion.

6. An energy absorbing apparatus according to claim 2, wherein the bottom of the U-shaped bent portion faces away from the driver.

7. An energy absorbing apparatus disposed between a steering wheel rim having spokes and a boss having a through-hole for receiving a steering shaft of a vehicle, comprising:
    (a) a continuous and annular portion surrounding the boss;
    (b) a second continuous and annular portion secured to one end portion of the spokes, the other end portion thereof being fixed to said steering wheel rim;
    (c) a continuous deformable portion formed between said first and second continuous and annular portions and bent in a plane including the axis of the through-hole of said boss;

(d) a selected number of slits provided in said deformable portion disposed radially around said boss; and (e) embossed portions each defined between a pair of adjacent slits, each embossed portion being offset from but mutually contiguous with the adjacent edges of the other portions of the deformable portion.

8. An energy absorbing apparatus according to claim 7, wherein said deformable portion has a substantially U-shaped cross-section as viewed in a direction orthogonal to the axis of the through-hole of said boss.

9. An energy absorbing apparatus according to claim 7, wherein each of said embossed portions is bounded by a pair of adjacent sheared portions and has an enlarged outer diameter.

10. An energy absorbing apparatus according to claim 7, wherein a hub for steering wheel spokes is secured to said second annular portion.

11. An energy absorbing apparatus according to claim 7, wherein the curve of said deformable portion faces away from the driver.

12. A steering wheel for a vehicle, comprising:
(a) a steering wheel rim by means of which a driver steers the vehicle;
(b) spokes each having one end thereof secured to said rim;
(c) a boss having a through-hole for receiving a steering shaft; and
(d) an energy absorbing assembly disposed between said boss and said spokes, said portion being constituted by an annular thin-walled plate which surrounds the boss, said energy absorbing assembly having a first annular portion fixed to said boss, a second annular portion fixed to the other end of said spokes, and a deformable portion between said first and second annular portions, said deformable portion being continuous, and provided with a plurality of embossed portions extending radially out of said boss through sheared portions, the edges of said embossed portions being contiguous with the adjacent edges of the deformable portion.

13. An energy absorbing apparatus according to claim 12, wherein said bent portions has a substantially U-shaped cross-section as viewed in a direction orthogonal with respect to the axis of the through-hole of said boss.

14. An energy absorbing apparatus according to claim 12, wherein the curve of said bent portion faces away from the driver.

15. An energy absorbing apparatus according to claim 12, wherein said embossed portions are disposed around said boss at equal spacings.

* * * * *